July 22, 1958 A. E. PINET 2,844,652

SWITCH DEVICE FOR MULTIPLEX CHANNEL TRANSMISSION RECEIVERS

Filed Sept. 16, 1953 2 Sheets-Sheet 1

United States Patent Office 2,844,652

Patented July 22, 1958

2,844,652

SWITCH DEVICE FOR MULTIPLEX CHANNEL TRANSMISSION RECEIVERS

André Eugène Pinet, Maisons Alfort, France

Application September 16, 1953, Serial No. 380,422

Claims priority, application France October 3, 1952

2 Claims. (Cl. 179—15)

The present invention relates to a switch device for channel receiving elements in multiplex systems using pulse modulation and time division.

In the present specification, the expression pulse modulation multiplex receiving elements denotes equipment designed for receiving and demodulating interleaved and recurrent pulses sent in sequence and in a certain order from particular pulses commonly known as synchronizing pulses, each pulse of a certain order in the sequence being related with a given communication channel and being modulated according to a given type of modulation in relation with the communication signals, telephone signals for instance, to be transmitted over said channel.

In the operation of pulse modulated multiplex telephone links, it often occurs that these links have the drawbacks either of stopping of the receiver in which case no signal is transmitted to the multiplex receiving equipment or of stopping the transmitter, in which case a variable level of background noise appears in the multiplex receiving equipment, due to the automatic gain control which is always included in the signal receiver.

One or the other of these faults, or both, disturb the operation of the receiving elements in the multiplex equipment and particularly act on the receiving elements for signalling signals (ringing signals for instance) and may cause untimely release of these elements.

An object of the present invention is to provide a switching device to lock the receiving elements of the multiplex equipment every time the pulses which should normally be received by said elements are not effectively applied to them due to one of the above mentioned faults.

Another object of the present invention is to provide the switching device for the receiving elements of the multiplex equipment with a circuit having such a time constant that the switch becomes effective only when the duration of the interruptions in the reception of the pulses to be received is sufficient to disturb the operation of the receiving elements for the signalling signals, whereby switching does not occur when the duration of the interruptions in the reception of the pulses to be received is too short to disturb the operation of said elements.

Figure 1:
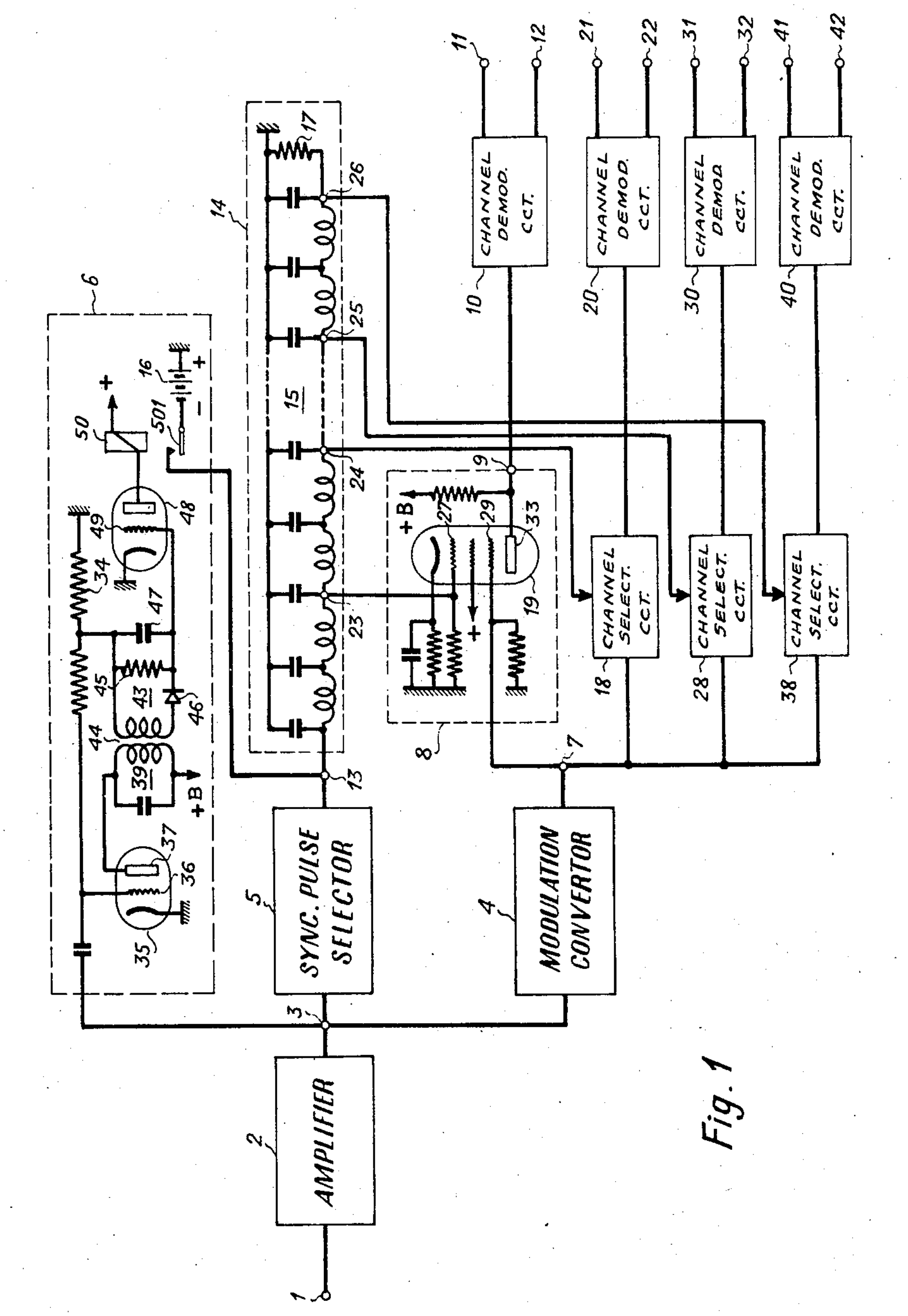
Figure 2:
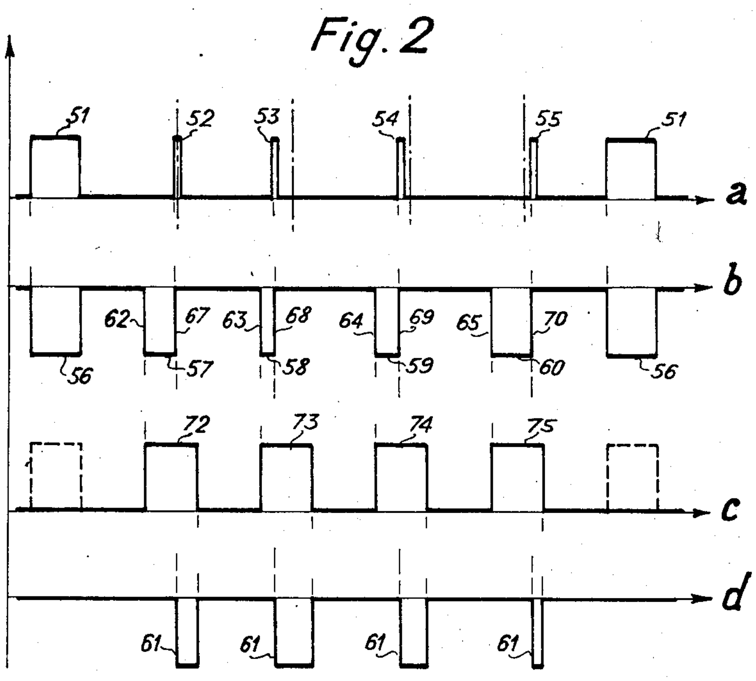
Figure 3:
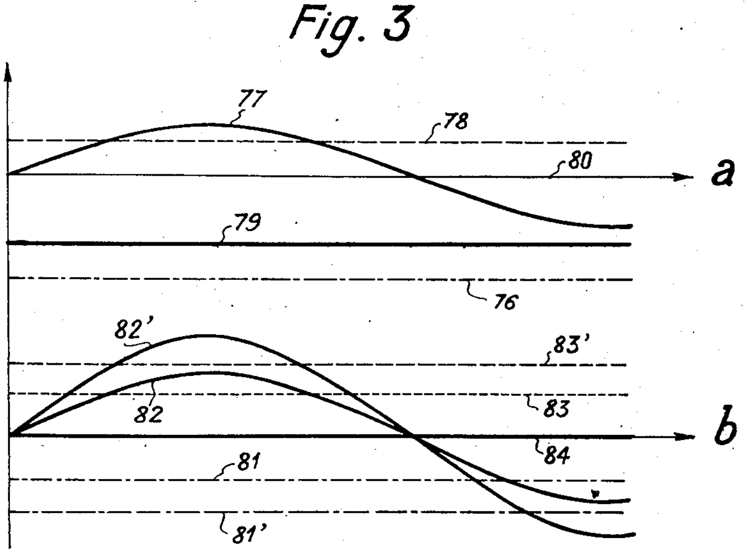

The invention will be more readily understood from the ensuing detailed description thereof, reference being made to the appended drawings wherein:

Figure 1 is a diagram, partly of the single-wire type, of the reception portion of a pulse modulation multiplex equipment, comprising the switching device for the channel receiving elements according to the invention; and Figures 2 and 3 show the wave shapes of signals at various points in the circuits of Figure 1.

Referring to Figure 1, the input terminal 1 of the receiving portion of a pulse modulation multiplex equipment, is connected either to a transmission line or to the output terminal of a radio-electric receiver. It will be assumed that position or "phase" modulated pulses are applied on terminal 1. The latter expression will be used preferably in the present specification.

An amplifier 2 is connected at its input to terminal 1 and at its output 3 to a modulation converter circuit 4, a synchronizing pulse selector circuit 5 and a switching device for the channel receiving elements 6 in accordance with the present invention.

The phase modulated pulses received at terminal 1 and assumed to be of a positive polarity are represented on line *a* of Figure 2 which is a diagram in which time is plotted as abscissae and the amplitudes of signals as ordinates. The synchronizing pulse is shown at 51 and the various channel pulses, four in number, for instance at 52, 53, 54 and 55. The synchronizing pulse 51 is supposed to be differentiated from channel pulses 52, 53, 54 and 55 by a special wave shape and it has been assumed here that the former has a greater duration than the latter.

The modulation converter circuit 4 receives the phase modulated pulses through the terminal 3, and it delivers at its output 7, by known means, pulses modulated according to another type of modulation, amplitude or duration modulated for instance. It has been assumed here that the converter 4 supplies duration modulated pulses, of a negative polarity, which are represented on line *b* in Figure 2, at 56, 57, 58, 59, 60. 56 is a constant duration pulse which is none other than the synchronizing pulse 51 changed in polarity, and 57, 58, 59, 60 are pulses modulated in duration by a displacement of their rear edges. The front edges 62, 63, 64, 65 of these pulses correspond, for each pulse, to a fixed instant of appearance in the cycle included between two successive synchronizing pulses 56, and the rear edges 67, 68, 69, 70 coincide with the instants of appearance of the pulses 52, 53, 54, 55. Modulation converter circuits making it possible to pass from phase modulated to duration modulated pulses are known in the art (see, for instance, "Waveforms," Massachusetts Institute of Technology, McGraw Hill Book Company Inc., New York, 1949, page 532).

To the output terminal 7 of the modulation converter circuit are connected selector circuits for the various channels 8, 18, 28, 38. The outputs such as 9 in each channel selector circuit are connected with the inputs of channel demodulating circuits 10, 20, 30, 40 each having two output terminals, respectively 11 and 12, 21 and 22, 31 and 32, 41 and 42 on the first one of which a low frequency signal is collected containing the intelligence transmitted and on the second one of which the signalling signals are collected.

The synchronizing pulse selector circuit 5 selects the synchronizing pulses 51 and transmits them to the input 13 of a time distribution circuit 14 represented as a delay line 15. This delay line 15 is terminated by an impedance 17 having a value equal to its characteristic impedance and it comprises a series of taps 23, 24, 25, 26 respectively connected to the channel selector circuits 8, 18, 28, 38. The channel selector circuits also receive pulses 72, 73, 74, 75 which are offset in time with respect to the synchronizing pulse 56 and which are represented on line *c* in Figure 2. Synchronizing pulse selector circuits are known in the pulse technique (see for instance "Pulse Techniques" by Moskowitz and Racker, Prentice-Hall Inc., New York, 1951, page 231).

The pulses 58–60 delivered by the modulation converter circuit 4 are applied to the suppressor grid 29 of a pentode tube 19 constituting the channel selector circuit 8 relative to the first channel. The control grid 27 of this tube is connected to the output terminal 23 the delay line 15 and it receives the channel unlocking pulses 72 relative to the first channel.

The tube 19 is non-conducting when its grids 27 and 29 receive simultaneously and respectively a positive pulse 72 and a negative pulse 56—60. The tube 19, on the contrary, is conducting when its suppressor grid 29 receives no negative pulses, 56—60, and its control grid 27 receives a positive pulse 72. The result is that there appears on terminal 9 a negative pulse 61 for those portions of the durations of the pulses 72 which do not coincide with the durations of the pulses 57.

The duration modulated pulses 6 corresponding to the first channel are applied to the demodulator 10 which demodulates them, thus reconstituting either the communication signal which is collected at terminal 11, or the signalling signal which is collected at terminal 12. Demodulator circuits such as 10 are used in all pulse modulation multiplex systems and will not be described here in detail. They generally include a low pass filter, an amplifier and a particular circuit for detecting the signalling signals.

The channel switching device 6 according to the invention comprises a triode tube 35 which receives on its control grid 36 the signal available on the terminal 3 of the amplifier 2. The grid 36 is grounded especially through a resistance 34, the function of which will appear later. In the circuit of the anode 37 of the tube 35 is inserted a resonant circuit 39 tuned to a frequency at which no high level components are encountered in the spectrum of the received pulses.

The voltage collected at the terminals of the inductance 44 coupled with inductance of the resonant circuit 39 is detected by means of the detector circuit 43 consisting of the rectifier 46, the resistance 45 and the condenser 47 and it appears, in a continuous form as a D. C. voltage, at the terminals of resistance 45. This resistance 45 is in series with the resistance 34 in the circuit of the grid 40 of the tube 48. The tube 48 comprises in its anode circuit a relay 50 which, through its make contact 501, connects a negative voltage source 16 with the terminal 13 at the input to the time distribution circuit 14.

When the pulses 51—55 of line *a* in Figure 2 are applied to the grid 36 of the tube 35, the grid current in that tube causes the appearance at the terminals of the resistance 34 of a voltage which has the effect of raising the grid 49 of the tube 48 to a negative potential with respect to ground. The average value of this negative potential is represented by the ordinate of the straight line 76 (Figure 3, line *a*). There is obtained, further, at the terminals of circuit 39, a sinusoidal voltage 77 which, after detection by the circuit 43, develops across the terminals of the resistance 45 an average voltage represented by the straight line 78 and which has the effect of raising the grid 49 to a positive potential with respect to ground.

The effective bias voltage of the grid 49 resulting from the combination of the two above voltages represented respectively by the stright lines 76 and 78 is represented by the straight line 79 and is sufficiently negative to render the tube 48 non-conducting. The relay 50 therefore passes no current; it remains at rest and does not make its contact 501 so that the switching device has no action on the receiving elements of the multiplex equipment.

In case no pulse is applied to the terminal 1, the current through the grid 36 is substantially zero and no voltage appears at the terminals of the resonant circuit 39. Consequently, the voltages developed at the terminals of the resistances 34 and 45 are zero and are represented by the axis of abscissae 80 in Figure 3 line *a*. The bias potential for the grid 49 with respect to ground is zero and under such conditions the tube 48 is conducting. The relay 50 is energized and the contact 501 applies a negative voltage to the input terminal 13 at the input to the time distribution circuit 14. This voltage is thus applied to all taps 23—26 connected with the channel selectors 8, 18, 28, 38 which has the effect of locking said channel selectors.

In case the amplifier 2 delivers, at its output terminal 3, a ground noise at any level, the voltage developed by the grid current 36 across the terminals of the resistance 34 is that represented by the straight line 81 (Figure 3, line *b*) and the voltage obtained at the terminals of the circuit 39 is a sinusoidal voltage represented at 82 which, after detection, develops across the terminals of the resistance 45 the voltage represented at 83. The ground noise having at least one component at the tuning frequency for the circuit 39, the ordinate of the straight line 83 in Figure 3, line *b*, is larger than the ordinate of the straight line 78 in Figure 3, line *a*. The actual bias voltage of the grid 49 resulting from the combination of the two above voltages represented respectively by the straight lines 81 and 83 is represented by the straight line 84 which is the axis of abscissae of Figure 3, line *b*. It is zero and consequently the tube 48 is conducting. The relay 50 is energized and the channel selectors 8, 18, 28, 38 are locked as in the above case.

If the level of the background noise varies, and increases, for instance, the voltage developed across the terminals of resistance 34 becomes more strongly negative, and the straight line by which it is represented passes from 81 to 81'. The voltage obtained at the terminals of the circuit 39 is represented at 82' and this same voltage, when detected, is more highly positive and the straight line by which it is represented passes from 83 to 83'. The actual bias voltage for the grid 49, resulting from the combination of the two above voltages represented respectively by the straight lines 81' and 83', is always represented by the straight line 84. It remains zero and the channel selectors remained locked.

It should be noted that the resistance 45 and the condenser 47 ensure for the switching device 6 a certain time constant, which makes it possible to avoid undersirable operations of this device, particularly for very short interruptions of the reception of the pulses to which the receiving elements for the signalling signals are insensitive.

The resonance frequency of the circuit 39 should be so chosen that the component having that frequency in the spectrum of the received pulses has the lowest possible level. For instance, for a twelve channel multiplex equipment using phase pulse modulation, the repetition frequency of the pulses being 8 kcs., a frequency of 12 kcs. is a suitable value for the resonance frequency of the circuit 39. For a twelve channel multiplex equipment using duration pulse modulation, still with a repetition frequency of 8 kcs. for the pulses, there is an advantage in choosing a resonance frequency for the circuit 39 higher than 12 kcs., due to the low frequency components offered by the pulse frequency spectrum in that case.

What is claimed is:

1. In a receiver for a multiple channel time division recurrent electric pulse transmission system, a locking device for locking all communication channels if no pulse is received, said locking device locking all communication channels if excessive noise appears, said locking device comprising first and second electron tubes each having at least one control grid, a cathode and an anode, means for receiving the whole of received pulses at the control grid of said first tube and deriving from the grid current thereof a first rectified voltage, means for applying said first rectified voltage to the control grid of said second tube so as to suppress the anode-current of said second tube, a resonant circuit energized by the anode-current of said first tube, means for deriving from said resonant circuit a second rectified voltage and for applying the second rectified voltage to the control grid of said second tube with a polarity opposite to that of the first rectified voltage so as to restore anode-current in said second tube, and an electromechanical relay operated by the anode-current of said second tube and actuating a contact rendering said receiver inoperative if the magnitude of the anode-current of said second tube exceeds a predetermined value.

2. A device as claimed in claim 1, wherein said receiver comprises a delay line provided with a number of taps, a plurality of further electron tubes, individually associated with said channels, provided with control grids respectively connected to said taps for the transmitting of control pulses to said control grids; and a negative biasing direct-current voltage source connectable by said contact to said delay line whereby said negative biasing voltage is coupled to all of the control grids of said further tubes so as to render all of said channels inoperative simultaneously.

References Cited in the file of this patent

UNITED STATES PATENTS

| | | |
|---|---|---|
| 2,543,738 | Houghton | Feb. 27, 1951 |
| 2,680,152 | Creamer | June 1, 1954 |
| 2,744,959 | Greefkes et al. | May 8, 1956 |